US008335487B2

(12) United States Patent
Wen et al.

(10) Patent No.: US 8,335,487 B2
(45) Date of Patent: Dec. 18, 2012

(54) METHOD FOR AUTHENTICATING USER TERMINAL IN IP MULTIMEDIA SUB-SYSTEM

(75) Inventors: Kai Wen, Shenzhen (CN); Jiongjiong Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1246 days.

(21) Appl. No.: 11/896,389

(22) Filed: Aug. 31, 2007

(65) Prior Publication Data
US 2008/0045214 A1    Feb. 21, 2008

Related U.S. Application Data

(63) Continuation of application No. PCT/CN2006/000822, filed on Apr. 27, 2006.

(30) Foreign Application Priority Data

Apr. 30, 2005    (CN) .......................... 2005 1 0070351

(51) Int. Cl.
H04M 1/66    (2006.01)
(52) U.S. Cl. ...................................... 455/410; 455/411
(58) Field of Classification Search .................. 455/411, 455/410
See application file for complete search history.

(56) References Cited

U.S. PATENT DOCUMENTS

| | | | |
|---|---|---|---|
| 6,434,700 B1 | 8/2002 | Alonso et al. | |
| 7,024,688 B1 | 4/2006 | Faccin et al. | |
| 2003/0154400 A1 | 8/2003 | Pirttimaa et al. | |
| 2003/0210678 A1 | 11/2003 | Haukka | |
| 2004/0029576 A1* | 2/2004 | Flykt et al. .................. | 455/422.1 |
| 2004/0176091 A1 | 9/2004 | Bajko et al. | |
| 2004/0205193 A1* | 10/2004 | Hurtta et al. .................. | 709/227 |
| 2004/0225878 A1 | 11/2004 | Costa-Requena et al. | |
| 2005/0083904 A1* | 4/2005 | Khartabil et al. ............. | 370/351 |
| 2005/0086541 A1* | 4/2005 | Rajaniemi ..................... | 713/202 |
| 2005/0097363 A1* | 5/2005 | Bajko et al. ................... | 713/201 |

(Continued)

FOREIGN PATENT DOCUMENTS

CN    1416241 A    5/2003

(Continued)

OTHER PUBLICATIONS

Extended European search report including supplementary European search report and European search opinion from the European Patent Office for European Application No. 06 74 1743, (Jun. 2, 2008).

(Continued)

Primary Examiner — Christopher M Brandt
(74) Attorney, Agent, or Firm — Conley Rose, P.C.; Grant Rodolph

(57) ABSTRACT

A method for authenticating user terminal in IMS network, the method includes: with regard to user request, Service-Call Session Control Function (S-CSCF) entity creates the authentication challenge utilizing Digest Authentication Algorithm, and sends the authentication challenge to user terminal through Proxy-Call Session Control Function (P-CSCF) entity; the user terminal creates the authentication response utilizing Digest Authentication Algorithm according to the user key and associated parameters with said authentication challenge, and sends the authentication response to S-CSCF entity through S-CSCF entity; S-CSCF entity authenticates said authentication response utilizing Digest Authentication Algorithm according to HAI and associated parameters, if the authentication passes, determines that the user terminal is authenticated successfully, otherwise, determines that the user terminal is authenticated failure.

15 Claims, 8 Drawing Sheets

U.S. PATENT DOCUMENTS

| | | | |
|---|---|---|---|
| 2005/0120198 A1* | 6/2005 | Bajko et al. | 713/150 |
| 2005/0131989 A1* | 6/2005 | Beckmann et al. | 709/201 |
| 2005/0149723 A1* | 7/2005 | Watkins et al. | 713/156 |
| 2005/0213580 A1* | 9/2005 | Mayer et al. | 370/395.2 |
| 2006/0030320 A1* | 2/2006 | Tammi et al. | 455/435.2 |
| 2006/0077965 A1* | 4/2006 | Garcia-Martin et al. | 370/352 |
| 2006/0142011 A1* | 6/2006 | Kallio | 455/445 |
| 2006/0143696 A1 | 6/2006 | Faccin et al. | |
| 2006/0155995 A1* | 7/2006 | Torvinen et al. | 713/169 |
| 2007/0097879 A1* | 5/2007 | Bleckert et al. | 370/254 |

FOREIGN PATENT DOCUMENTS

| | | |
|---|---|---|
| CN | 1553656 A | 12/2004 |
| CN | 100461942 C | 2/2009 |
| CN | 100571134 C | 12/2009 |
| EP | 1 414 212 A1 | 4/2004 |
| WO | WO-02/11469 A2 | 2/2002 |
| WO | WO 02/082296 A1 | 10/2002 |
| WO | WO-02/091786 A1 | 11/2002 |
| WO | WO 03081876 A1 * | 10/2003 |
| WO | WO 03/105436 A1 | 12/2003 |
| WO | WO 2004/084464 A2 | 9/2004 |

OTHER PUBLICATIONS

Tao et al.; "Open Service Access in 3G Mobile Communication"; Telecommunications Network Technology, No. 3, pp. 17-20, (2003).
European Patent Office Communication pursuant to Article 94(3) EPC, European search opinion for Application No. 06741743.6-1244, mailed Aug. 24, 2009, Huawei Technologies Co., Ltd. (3 pgs.).
European Patent Office Communication pursuant to Article 94(3) and Rule 71(1) EPC, for Application No. 06722247.1-2413, mailed Jun. 2, 2008, Huawei Technologies Co., Ltd. (5 pgs.).
European Patent Office Communication pursuant to Article 96(2) EPC, for Application No. 06722247.1-2413, mailed Aug. 13, 2007, Huawei Technologies Co., Ltd. (4 pgs.).
European Patent Office Communication pursuant to Rule 44a EPC, the supplementary European search report (Art 1572(2)(a) EPC) and the European search opinion for Application No. 06722247.1-2413, mailed Apr. 24, 2007, Huawei Technologies Co., Ltd. (7 pgs.).
Written Opinion of the International Searching Authority (translation) dated (mailed) Jul. 27, 2006, issued in related Application No. PCT/CN2006/000595, filed Apr. 3, 2006, Huawei Technologies Co., Ltd. et al. (4 pgs).
Written Opinion of the International Searching Authority (translation) dated (mailed) Sep. 7, 2006, issued in related Application No. PCT/CN2006/000822, filed Apr. 27, 2006, Huawei Technologies Co., Ltd. et al. (4 pgs.).
First Chinese Office Action (Partial Translation) issued in related Application No. 200510071538.2, dated (mailed) Dec. 21, 2007 (Chinese version attached) (8 pgs.).
Second Chinese Office Action (Partial Translation) issued in related Application No. 200510071538.2, dated (mailed) Jun. 27, 2008 (Chinese version attached) (8 pgs.).
Office Action issued in the USPTO for related U.S. Appl. No. 11/629,346, filed May 7, 2007, dated Jul. 6, 2010, Huawei Technologies Co., Ltd. (30 pgs.).
Office Action issued in the USPTO for related U.S. Appl. No. 11/629,346, filed May 7, 2007, dated Dec. 18, 2009, Huawei Technologies Co., Ltd. (32 pgs.).
3GPP TR 33.978 V6.0.1 (Apr. 2005); *Technical Report*; $3^{rd}$ Generation Partnership Project; Technical Specification Group Services and System Aspects; Security Aspects of Early IMS (Release 6) (21 pgs.).
3GPP TS 33.203 V6.6.0 (Mar. 2005); *Technical Specification*; $3^{rd}$ Generation Partnership Project; Technical Specification Group Services and System Aspects; 3G security; Access security for IP-based services (Release 6) (44 pgs.).
3GPP TS 29.229 V.6.4.0 (Mar. 2005); *Technical Specification*; $3^{rd}$ Generation Partnership Project; Technical Specification Group Core Network; Cx and Dx interfaces based on the Diameter protocol; Protocol details (Release 6) (27 pgs.).
3GPP TR 33.878 V1.0.0 (Dec. 2004); *Technical Report*; $3^{rd}$ Generation Partnership Project; Technical Specification Group Services and System Aspects; Security Aspects of Early IMS (Release 6) (20 pgs.).
Arkko, J. et al.; "Security Mechanism Agreement for the Session Initiation Protocol (SIP)"; Network Working Group; Request for Comments: 3329; Category: Standards Track; The Internet Society, Jan. 2003; (23 pgs.).
Rosenberg, J. et al.; "SIP: Session Initiation Protocol"; Network Working Group; Request for Comments: 3261; Obsoletes: 2543; Category: Standards Track; The Internet Society, Jun. 2002; (539 pgs.).
Niemi, A. et al.; "Hypertext Transfer Protocol (HTTP) Digest Authentication Using Authentication and Key Agreement (AKA)"; Network Working Group; Request for Comments: 3310; Category: Informational; The Internet Society, Sep. 2002; (37 pgs.).
3GPP SA WG3: "Universal Mobile Telecommunications System (UMTS); Security aspects of early IMS (3GPP TR 33.978 version 6.0.1 Release 6); ETSI TR 133 978" Apr. 2005. *ETSI Standards, European Telecommunications Standards Institute*, vol. 3-SA3, No. V601., pp. 1-22.
3GPP SA WG3: "Digital cellular telecommunications system (Phase 2+); Universal Mobile Telecommunications System (UMTS); 3G security; Access security for IP-based services (3GPP TS 33.203 version 6.6.0 Release 6); ETSI TS 133 203" Mar. 2005. *ETSI Standards, European Telecommunications Standards Institute*, vol. 3-SA3, No. V660., pp. 1-45.
Siemens: "Comments on use of 401 Unauthorized and 399 Warning in Early IMS" 3GPP Working Paper, Apr. 26, 2005, <http://www.3gpp.org/ftp/tsg_sa/WG3_Security/TSGS3_38_Geneva/Docs/S3-050237.zip>.

* cited by examiner

METHOD FOR AUTHENTICATING USER TERMINAL IN IP MULTIMEDIA SUB-SYSTEM

CROSS-REFERENCE TO RELATED APPLICATIONS

The present application is a continuation application of PCT application No. PCT/CN2006/000822, filed Apr. 27, 2006, which claims Chinese priority No. 200510070351.0, filed Apr. 30, 2005.

FIELD OF THE INVENTION

The present invention relates to security technologies in the field of network communications, and in particular to a method for authenticating a user equipment in an IP multimedia subsystem (IMS).

BACKGROUND OF THE INVENTION

An IP multimedia subsystem (IMS), which is a core session control layer of a fixed or mobile network, has become an issue discussed currently in the industry. Numerous IMS-related specifications have been defined in the 3$^{rd}$ Generation (3G) mobile communication systems and the TISPAN (Telecommunications and Internet Converged Services and Protocols for Advanced Networking) standards, including various aspects such as network architectures, interfaces, protocols, etc. Particularly, the security is an important aspect considered for the 3G and the TISPAN. According to the current specifications, an IMS network is divided into an access domain and a network domain in terms of the security, and security specifications are defined respectively for the access domain and the network domain. A security model of the IMS network is shown in FIG. 1.

A Call Session Control Function (CSCF) entity defined in the IMS network is adapted to accomplish such functions as control and routing during a call or session. P/S/I-CSCFs are distinguished from each other as per their different functions. The Proxy-Call Session Control Function (P-CSCF, Proxy-CSCF) is adapted for an access of a user equipment (UE), and any UE shall gain an access to the IMS network through the P-CSCF. The Service-Call Session Control Function (S-CSCF, Service-CSCF) provides such core functions as session control and routing. The interrogating-Call Session Control Function (I-CSCF, Interrogating-CSCF) is adapted for selection of the S-CSCF and the intercommunication between different service providers or different area networks, and is adapted to provide such functions as network masking. A Home Subscriber Server (HSS), which has evolved from a Home Location Register (HLR) and an Authentication Center (AUC), is adapted to store subscription data and configuration data of subscribers, and to support a function of Authentication & Authorization (AAA) for the subscribers.

As shown in FIG. 1, a security mechanism for the access domain includes two interfaces related to a User Equipment (UE): Interface 1 and Interface 2, where Interface 1 is a bidirectional authentication interface between the UE and an IMS network, and adapted to enable an subscriber authentication function, and Interface 2 is adapted to guarantee the communication security between the UE and the P-CSCF.

Interface 1 and Interface 2 are implemented in the 3GPP through application of an IMS AKA (Authentication, Key Authentication) mechanism during a registration process for the user equipment. Main network entities involved during the registration process of the user equipment include the user equipment UE, the P-CSCF, the S-CSCF and the HSS.

As shown in FIG. 2, the application of the IMS AKA mechanism during the registration process of the user equipment can be as follows.

1. An initial key K is shared between the UE and the HSS.

2. A subscriber initiates a registration request message SM1, and the S-CSCF requests data from the HSS through a message CM1. The HSS generates an authentication quintuple based on the initial key K and a sequence number SQN, and delivers the quintuple to the S-CSCF through a message CM2. The quintuple includes random data (RAND), an authentication token (AUTN), an expected response (XRES), an integrity key (IK) and a cipher key (CK).

3. The S-CSCF returns to the subscriber a 401 response (Authentication Challenge) carrying quadruple information except the XRES.

4. The P-CSCF stores information on the IK and the CK, and in the 401 response, sends information on the RAND and the AUTN to the UE.

5. The UE authenticates the credibility of the network equipment in accordance with information such as the initial key K and the SQN and the received AUTN issued from the network equipment. If the authentication succeeds, the network equipment is credible, and information on a response RES is generated according to the RAND and the K. The RES is taken as a "password" for calculation of a Response by the UE. A calculation result is sent to the network side in a message SM7 (Authentication Response). In the meantime, the UE calculates the IK and the CK itself.

6. The S-CSCF receives in a message SM9 the Response information generated according to the RES, and compares the information with the calculation result from the XRES. If both are identical, it can be determined that the authentication for the subscriber succeeds.

As can be seen from the above, the UE initiates the registration to the IMS network, and the bidirectional authentication between the UE and the IMS network is realized through the IMS AKA. Also, between the UE and the P-CSCF, a security alliance can be established, and both the cipher key CK and the integrity key IK can be shared. Both of the keys can be used to establish a secure communication channel between the UE and the P-CSCF.

For more information on the "IMS Access Domain Security", reference can be made to 3GPP Technical Standard TS33.203, which gives detailed descriptions on the security of the IMS-network access domain, and for more information on the IMS AKA mechanism, reference can be made to TS33.203, Section 6.1 and IETF RFC3310.

In the wireless field, there are a large number of existing user equipments, which are inconsistent with the 3GPP protocol specifications and cannot support the access domain security mechanism as required for the 3GPP TS 33.203, such as a user equipment using a SIM card or a 2G user equipment using a USIM/ISIM card. In order to provide an IMS service for such an end subscriber, an access domain security mechanism referred to as "Early IMS" has been defined in TR 33.878. The basic principle for the Early IMS security access domain lies in that the application layer security can be enabled above the access layer security. After an equipment access has been authenticated at the access layer, the authenticated information is transferred to the application layer, which in turn performs an application layer security authentication for the subscriber request in accordance with such information. As shown in FIG. 3, the security mechanism for the Early IMS access domain can be divided into the following parts.

1. PDP Activation: a user equipment gains an access to a GPRS network through a Gateway GPRS Supporting Node (GGSN). During a Packet Data Protocol (PDP) activation process, the GGSN authenticates subscriber identities IMSI and MSISDN, and allocates a network transport layer identity (IP address) to the user equipment. The GGSN transfers correlations between the subscriber identities and the equipment IP address through a message "Accounting Request Start" to the HSS, which in turn stores the correlations.

2. Registration Request Authentication: the user equipment initiates a registration request REGISTER. When the P-CSCF forwards the request to the S-CSCF, a source IP address of the user equipment can be carried in the REGISTER request. In accordance with a public subscriber identity in the REGISTER request, the S-CSCF interrogates whether the user equipment has been registered. If it has not been registered, the equipment IP address corresponding to the public subscriber identity is obtained by the HSS through an MAR/MAA (the HSS statically configures the correlation between the public subscriber identity and the MSISDN, and thus the corresponding equipment IP address can be obtained through the public subscriber identity). The S-CSCF checks the equipment source IP address from the received REGISTER request, and if it is the same as that obtained from the HSS, the authentication succeeds.

3. Non-registration Request Authentication: since no security channel is established between the P-CSCF and the UE, the S-CSCF is required to authenticate all request messages initiated by the equipment, in order to ensure that the username be in correspondence with the source IP address. After the subscriber has been registered, the S-CSCF stores the correlations between the subscriber identities and the IP address. Upon receipt of any non-registration request message, the source IP address of the user equipment initiating the request has to be compared with the IP address stored in the S-CSCF for the subscriber, and if they are different, the request can be rejected.

In view of the above, the application of the Early IMS has the following limitation.

The GPRS access network can guarantee that the IP address of the user equipment will not be imitated by any other user, and thus, each of the equipments can only send a message with its own IP address.

The communication between the GPRS and the P-CSCF can be secured, and no NAT exists between the GPRS and the P-CSCF.

The simultaneous registrations for a single public subscriber identity of IMPU (IP Multimedia Public Identity) with respect to a plurality of private user identities of IMPI (IP Multimedia Private Identity) can not be supported.

Therefore, the security mechanism for the Early IMS access domain can be only directed to a specific wireless access environment, and also impose a special requirement on the access network. If a relevant user equipment has to be upgraded or adapted, the subscriber access security in any other access environment cannot be guaranteed.

SUMMARY OF THE INVENTION

In view of the above, the present invention provides methods for authenticating a user equipment in an IMS network, so that a conventional user equipment supporting a Digest Authentication can gain a secure access in different access environments.

The present invention provides a method for authenticating a user equipment in an IP multimedia subsystem, including:

generating by a Serving-Call Session Control Function (S-CSCF) entity an authentication challenge through an Digest Authentication Algorithm in response to a subscriber request, and sending the authentication challenge to a user equipment through a Proxy-Call Session Control Function (P-CSCF) entity;

generating by the user equipment an authentication response through the Digest Authentication Algorithm in accordance with a subscriber key as well as related parameters in the authentication challenge, and sending by the P-CSCF entity the authentication response to the S-CSCF entity; and verifying by the S-CSCF entity the authentication response through the Digest Authentication Algorithm in accordance with information HA1 related to the subscriber key as well as related parameters, and if the verification has been passed, determining that the authentication for the user equipment succeeds, otherwise determining that the authentication for the user equipment fails.

The subscriber request is a registration request.

The Digest Authentication Algorithm is a Digest MD5 algorithm, and the S-CSCF entity may obtain the HA1 through interacting with a Home Subscriber Server (HSS) prior to generation of the authentication challenge or upon receipt of the authentication response.

The obtaining the HA1 includes:

sending by the S-CSCF entity to the HSS a request message carrying a subscriber identity; and generating by the HSS the HA1 in accordance with a domain name of a domain corresponding to the subscriber, the subscriber identity and the subscriber key, and returning to the S-CSCF entity the HA1 in a response message.

The Digest Authentication Algorithm is a Digest MD5-Sess algorithm.

The obtaining the HA1 includes:

sending by the S-CSCF to the HSS a request message carrying a subscriber identity, a parameter "nonce" and a parameter "cnonce" upon receipt of the authentication response; and generating by the HSS the HA1 in accordance with the domain name of a domain corresponding to the subscriber, the subscriber identity, the subscriber key, the parameter "nonce" and the parameter "cnonce", and returning to the S-CSCF entity the HA1 in a response message.

The subscriber identity is a public user identity or a private user identity.

After the authentication for registration of the user equipment succeeds, a subsequent request message can be authenticated in accordance with an authentication method for a subsequent request message configured at the HSS.

The authentication method for a subsequent request message includes one of authenticating only a registration request message, authenticating only a registration request and a session request message, and authenticating each request message.

In the case of authentication for each request message, an authentication session for a subscriber request message is configured equal to a subscriber registration period or a subscriber session period.

The present invention provides a method for authenticating a user equipment in an IP multimedia subsystem, including:

generating, by a Home Subscriber Server (HSS), parameters required during a Digest Authentication for generation of an authentication challenge in accordance with a subscriber identity in a request message sent from an Serving-Call Session Control Function (S-CSCF) entity, and sending the parameters to the S-CSCF entity;

generating by the S-CSCF entity an authentication challenge in accordance with the parameters, and sending the authentication challenge to a user equipment through a Proxy-Call Session Control Function (P-CSCF) entity;

generating by the user equipment an authentication response through a Digest Authentication Algorithm in accordance with a subscriber key as well as related parameters in the authentication challenge, and transferring the authentication response to the HSS through the P-CSCF entity and the S-CSCF entity; and verifying, by the HSS, related contents in the authentication response through the Digest Authentication Algorithm in accordance with the subscriber key and related parameters, and if the verification has been passed, informing the S-CSCF entity that the authentication for the user equipment succeeds, otherwise informing the S-CSCF entity that the authentication for the user equipment fails.

The subscriber identity is a public user identity or a private user identity.

The subscriber request is a registration request.

After the authentication for registration of the user equipment succeeds, a subsequent request message is authenticated in accordance with an authentication method for a subsequent request message configured at the HSS.

The authentication method for a subsequent request message includes one of authenticating only a registration request message, authenticating only a registration request and a session request message, and authenticating each request message.

In the case of authentication for each request message, an authentication session for a subscriber message is configured equal to a subscriber registration period or a subscriber session period.

In summary, according to the invention, in the IMS access domain, a conventional user equipment incapable of supporting the IMS AKA can be authenticated through the Digest authentication method supported by the equipment, without any special requirement on the access environment. Therefore, it is possible to enable the compatibility with a conventional user equipment, and also to be applicable in various access environments, such as a mobile or fixed access environment, etc.

In the invention, each request message including a session establishment request message is authenticated, and thus the security of a signaling transmission channel is guaranteed.

Furthermore, the authentication for a user equipment can be enabled by the S-CSCF entity or the HSS, and hence the flexibility of networking can be enhanced.

DETAILED DESCRIPTION OF THE INVENTION

Figure 1:
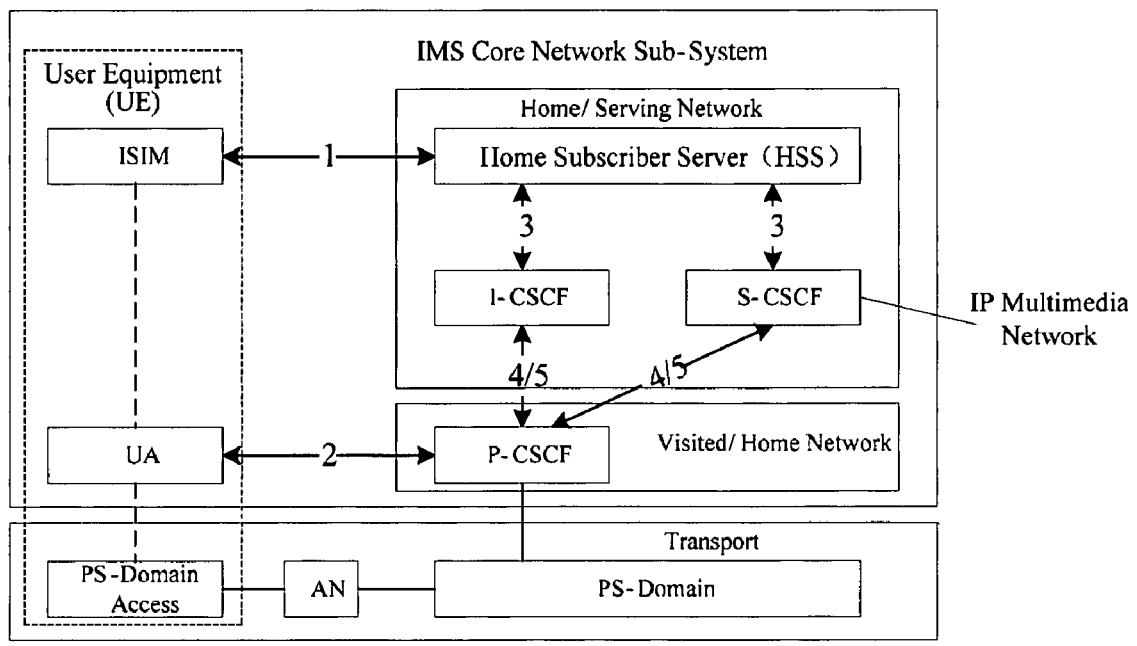
FIG. 1 shows a security model for an IMS network in the prior art.
Figure 2:
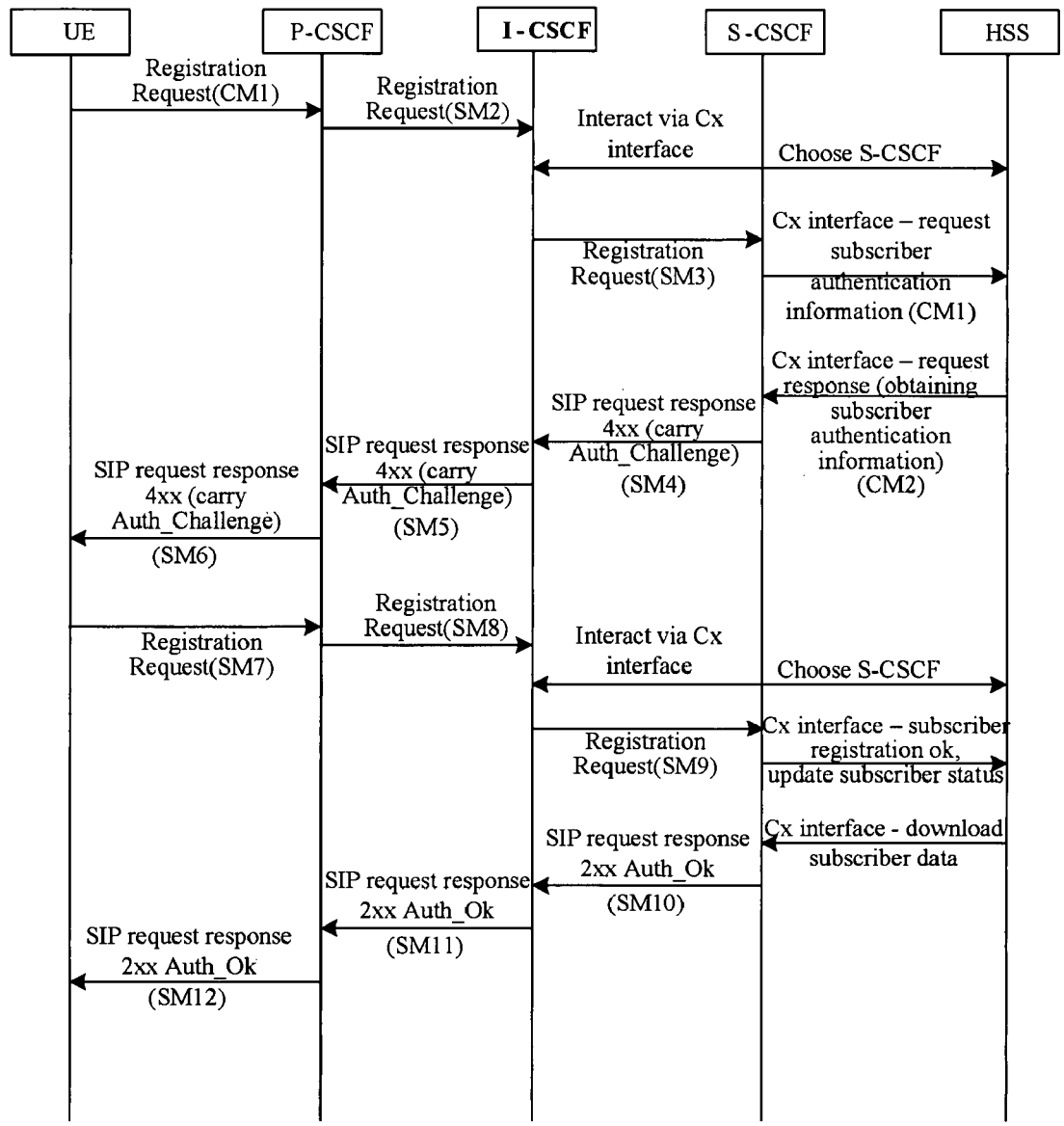
FIG. 2 shows a flow chart for registration of a user equipment in the prior art.
Figure 3:
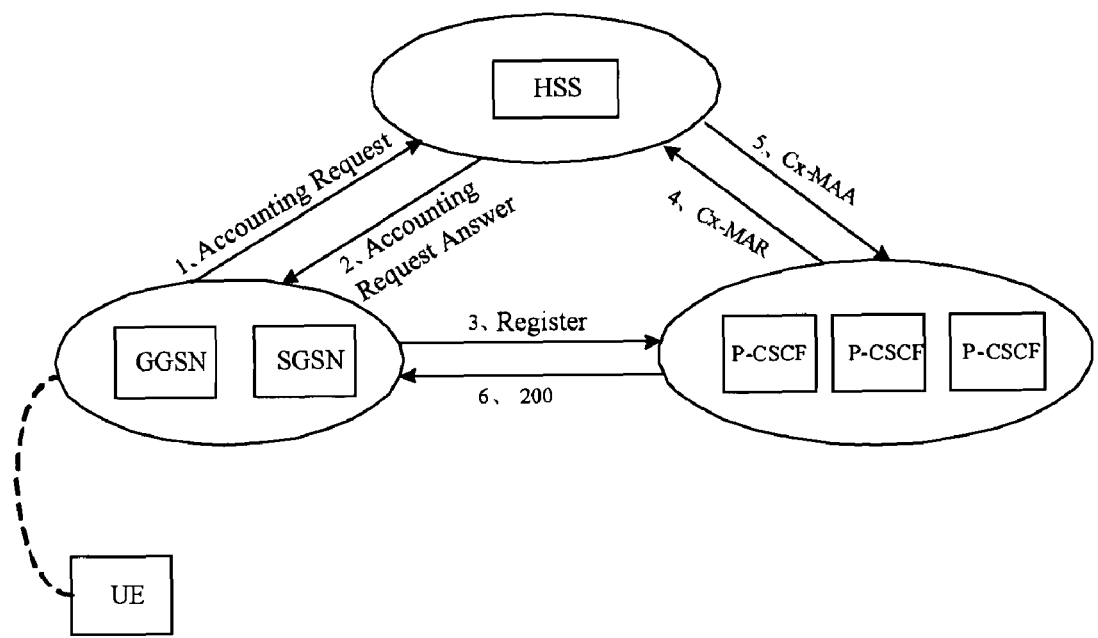
FIG. 3 shows a schematic flow chart for a security mechanism for in an Early IMS access domain in the prior art.

In accordance with RFC3261, a number of existing Session-Initiation-Protocol (SIP) equipments can support the Digest Authentication, but cannot support the IMS AKA required for the 3GPP. Therefore, it is necessary for an IMS network to support the Digest Authentication, and thus an SIP equipment in compliance with RFC3261 can be served. Specifically, the Digest Authentication according to the invention includes an MD5 or MD5-sess authentication algorithm.

Based upon the Digest Authentication method, the authenticity of a subscriber initiating a request can be verified. When the authenticity of the subscriber has been confirmed, the network can determine whether to provide the corresponding service for the request of the subscriber. The Digest Authentication can be realized through a basic "Challenge-Response" way, where "Authentication Challenge" information is carried in a header field of WWW-Authenticate, while "Authentication Response" information is carried in a header field of Authorization. For more information on the Digest Authentication, reference can be made to RFC3261, Chapter 22, and RFC2617 and RFC2069.

(1) Main parameters involved in the WWW-Authenticate include:

realm-"biloxi.com",
qop="auth,auth-int",
nonce="dcd98b7102dd2f0e8b11d0f600bfb0c093",
opaque="5ccc069c403ebaf9f0171e9517f40e41".

In particular:

The parameter "realm" indicates for a user equipment the "domain" from which an authentication is currently performed on the user terminal.

If the value of the parameter "qop" (i.e., quality of protection) is "auth", it indicates that it is intended only for subscriber authentication, or "auth-int" indicating that it is intended simultaneously for both subscriber authentication and integrity protection of a message body.

The parameter "nonce" is generated by a network side, in correspondence with local time of the network side. The user equipment sends back, in a header field of a returned Authorization authentication response, the content of "nonce". From the content in the parameter "nonce", the network side obtains the time when the parameter "nonce" was generated (i.e., the time when WWW-Authenticate authentication request was sent). If the difference between the time when the parameter "nonce" was generated and the time when Authorization is currently received is too large, it can be indicated that a "Replay Attack" exists.

(2) The Authorization header field generated by a user equipment from an account number and the received WWW-Authenticate content mainly includes:

realm="biloxi.com",
nonce="dcd98b7102dd2f0e8b11d0f600bfb0c093",
uri="sip:bob@biloxi.com",
qop=auth,
nc=00000001,
cnonce="0a4f113b",
response="6629fae49393a05397450978507c4ef1",
opaque="5ccc069c403ebaf9f0171e9517f40e41".

In particular:

The parameter "nc" indicates the number of times the same "nonce" has been used for generating an authentication response. The network side can maintain a counter, and when the network receives the same nc-value twice or more times, it indicates that a Replay Attack exists.

The parameter "cnonce" is used for a UE to authenticate the network, and this parameter is generated at a user equipment, and is sent back by the network side in the header field of Authentication-Info.

The parameter "response" is used for verification of a subscriber identity. The UE obtains data of this parameter in accordance with a username, a user password, values of realm-value, "nonce", uri, etc. The network side also can obtain a data string through the same algorithm in accordance such input data. If both of the data are equal, it proves that the user password is correct, and thus the identity of the subscriber can be verified. The algorithm for generation of a parameter "response" (i.e., Rrequest-Digest) will be described hereinafter (for details, reference can be made to RFC2617, Sections 3.2.2.1-3.2.2.3):

```
request-digest = <""> < KD(H (A1), unq(nonce-value)
        ":" nc-value
        ":" unq(cnonce-value)
        ":" unq(qop-value)
        ":" H(A2)
) <"">
```

In particular, the parameters A1 and A2 can be calculated as following:

A1=unq(username-value) ":" unq(realm-value) ":" passwd

A2=Method ":" digest-uri-value (3) In addition to the two basic header fields, "WWW-Authenticate" and "Authorization", another header field of Authentication-Info has been defined in RFC2617. This header field can be sent, in a success response to an equipment authentication, to the UE, and thus additional authentication-related information can be conveyed. However, this header field does not exist in RFC2069, but is an extension for RFC2617definitions. Specific parameters are as following:

Authentication-Info:

qop=auth, rspauth="6629fae49393a05397450978507c4ef1", cnonce="0a4f113b", nc=00000001

The parameter "qop" indicates an authentication type (whether to require message body protection), which has been described above.

The parameter "rspauth" is used for the network to indicate for the UE that it knows the UE password. Upon receipt of this parameter, the UE performs calculation to determine whether the calculation result is identical with the value of the parameter. If they are identical, the UE can determine that the network is credible. This parameter can be calculated as the same way as the parameter "response" was calculated described above.

The parameter "cnonce" is used for the network to return to the UE the content carried in the Authorization header field as it was.

The parameter "nc", i.e. nonce-count, indicates the number of times the same "nonce" is used for generation of an authentication response.

In addition to the above four parameters, the parameter. "nextnonce" can be carried in this header field. The parameter "nextnonce" contains a parameter "nonce" which is used for generating next authentication response by the user equipment as expected by the network. With this parameter, the network can realize a one-off parameter "nonce" or modify the value thereof.

In order to support the Digest Authentication in the IMS network, the operator should configure the corresponding Digest authentication mechanism supported for a subscriber in accordance with a subscriber identity of the subscriber in the HSS. The HSS determines to perform the Digest Authentication for the user equipment in accordance with the subscriber identity and corresponding subscriber configuration data. The subscriber identity can be a private user identity, which is usually applicable in the case of an access of a subscriber with a subscriber card (such as an ISIM card, etc.). In the case that the user equipment has no alike subscriber card, a corresponding authentication mechanism can be configured for a public subscriber identity (for consistency of internal processes, the private user identity can be considered as being identical to the public user, identity).

Figure 4A:
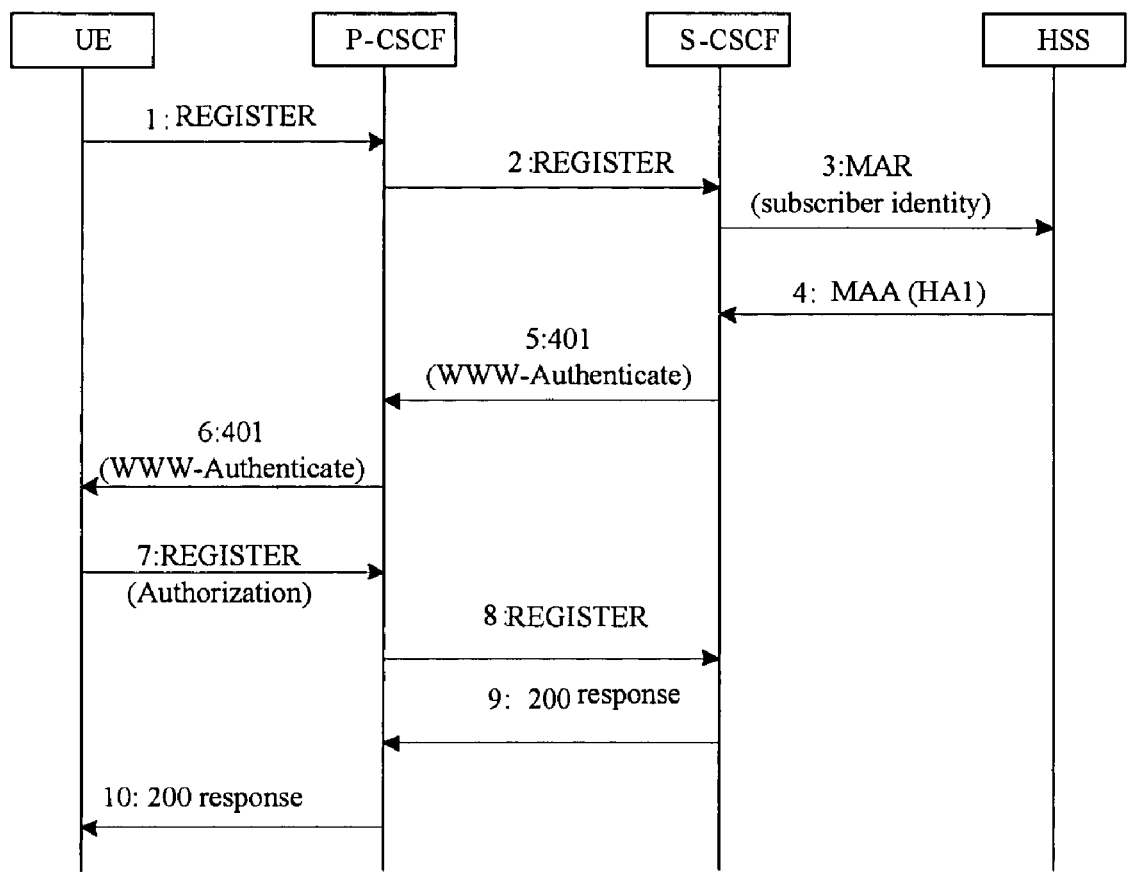
FIG. 4A and FIG. 4B are respectively flow charts for user equipment authentication through an S-CSCF entity with the use of Digest MD5 and Digest MD5-sess according to the invention.

In the IMS access domain, as shown in FIG. 4A, the S-CSCF entity can perform the following specific steps for the Digest MD5 authentication in response to a registration request from a user equipment.

In step 1, the user equipment UE initiates a registration request message REGISTER to the P-CSCF entity.

In step 2, the P-CSCF entity forwards the registration request message REGISTER to the S-CSCF entity.

In step 3, the S-CSCF entity initiates to the HSS a Multimedia-Auth-Request (MAR) message carrying a subscriber identity that can be obtained from the registration request message REGISTER.

In step 4, the HSS receives the MAR message, and determines to perform the Digest MD5 authentication for the subscriber in accordance with subscriber configuration data corresponding to the subscriber identity. The HSS calculates an H(A1) through a formula H(A1)=H(unq(username-value) ":" unq(realm-value) ":" passwd) in accordance with the username "username-value", the corresponding domain name "realm-value" and the subscriber password "passwd" in the subscriber configuration data, and returns to the S-CSCF a Multimedia-Auth-Answer (MAA) message carrying the H(A1).

In step 5, the S-CSCF stores the HA1, and also generates respective parameters for the Authentication Challenge, such as the parameter "nonce". The parameter "realm", i.e. a domain name of a domain where the subscriber is located, may be obtained directly from the subscriber identity. Moreover, the header field of WWW-Authenticate can be generated in accordance with the respective parameters, and then be delivered in a 401 response to the P-CSCF entity.

In step 6, the P-CSCF receives the 401 response from the S-CSCF, and checks the content of the message to determine that the authentication algorithm is for the Digest Authentication. At this point, the P-CSCF does not modify the 401 response, and transparently transmits the 401 response to the user equipment UE (in the case of the IMS AKA, the P-CSCF should store the IK/CK for the subsequent IPSec establishment.)

In step 7, the user equipment obtains the WWW-Authenticate (Authentication Challenge) from the 401 response, and then calculates a "request-digest" in conjunction with its key. Further, the user equipment carries the "request-digest" in the parameter "response" of the authentication response Authorization, and sends to the P-CSCF entity the authentication response in a re-initiated registration request message REGISTER.

In step 8, the P-CSCF entity transfers the registration request REGISTER to the S-CSCF entity.

In step 9, the S-CSCF entity receives the authentication response, and then calculates a "request-digest" in conjunction with the HA1, and compares "request-digest" with the content of parameter "response" of the authentication response Authorization. If both are identical, the authentication succeeds, with a 200 response returned to the subscriber side, otherwise the authentication fails.

In step 10, the P-CSCF entity sends a 200 response message to the user equipment.

Figure 4B:
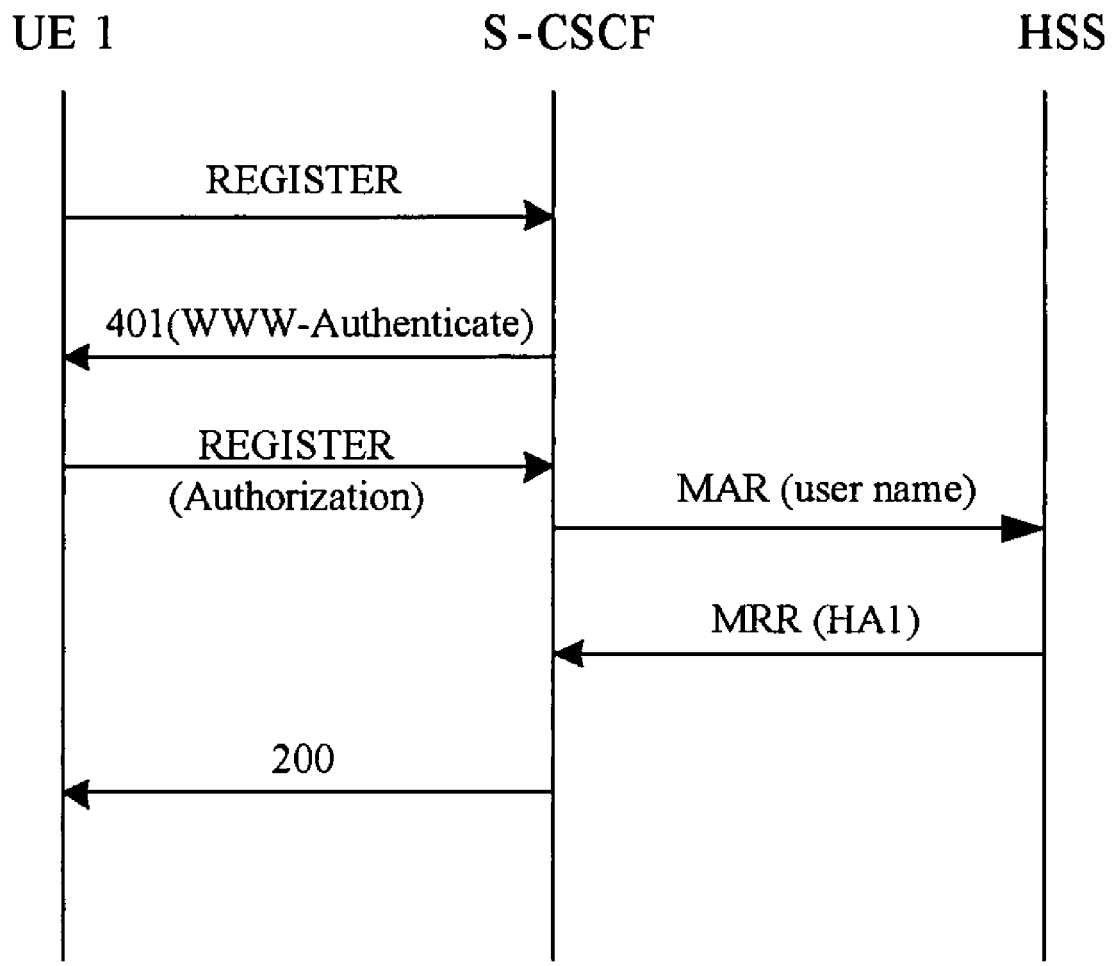

In the above, the MAR/MAA interaction between S-CSCF and HSS also can be performed after the S-CSCF entity receives the authentication response, as shown in FIG. 4B, where the P-CSCF entity has been omitted. The implementation in this case is the same in principle as shown in FIG. 4A, and is not described here.

The HA1 can be obtained through an HASH calculation taking the subscriber key as an input, without involving any subscriber key plaintext. Therefore, this case can be more secure in comparison with the case that a key plaintext is transferred between the S-CSCF and the HSS. However, if the communication between the S-CSCF and the HSS is not secure, the HA1 may be obtained by an attacker. For this method, a security channel, such as IPSec between the S-CSCF and the HSS, is recommended.

For the MD5-sess algorithm, one-time authentication-related random numbers, such as "nonce", "cnonce" and the like, can be involved in the calculation of the HA1, and thus the disadvantages of the MD5 algorithm can be overcome. Even if the HA1 is obtained by the attacker, he/she cannot proceed with embezzlement of a subsequent service. For this reason, the security channel between the S-CSCF and the HSS may not be required. The calculation of the HA1 for the Digest MD5-sess algorithm is as following:

$$H(A1) = H(H(unq(username\text{-}value) ":" unq(realm\text{-}value) ":" passwd\ ) ":" unq(nonce\text{-}value) ":" unq(cnonce\text{-}value))$$

Figure 5:
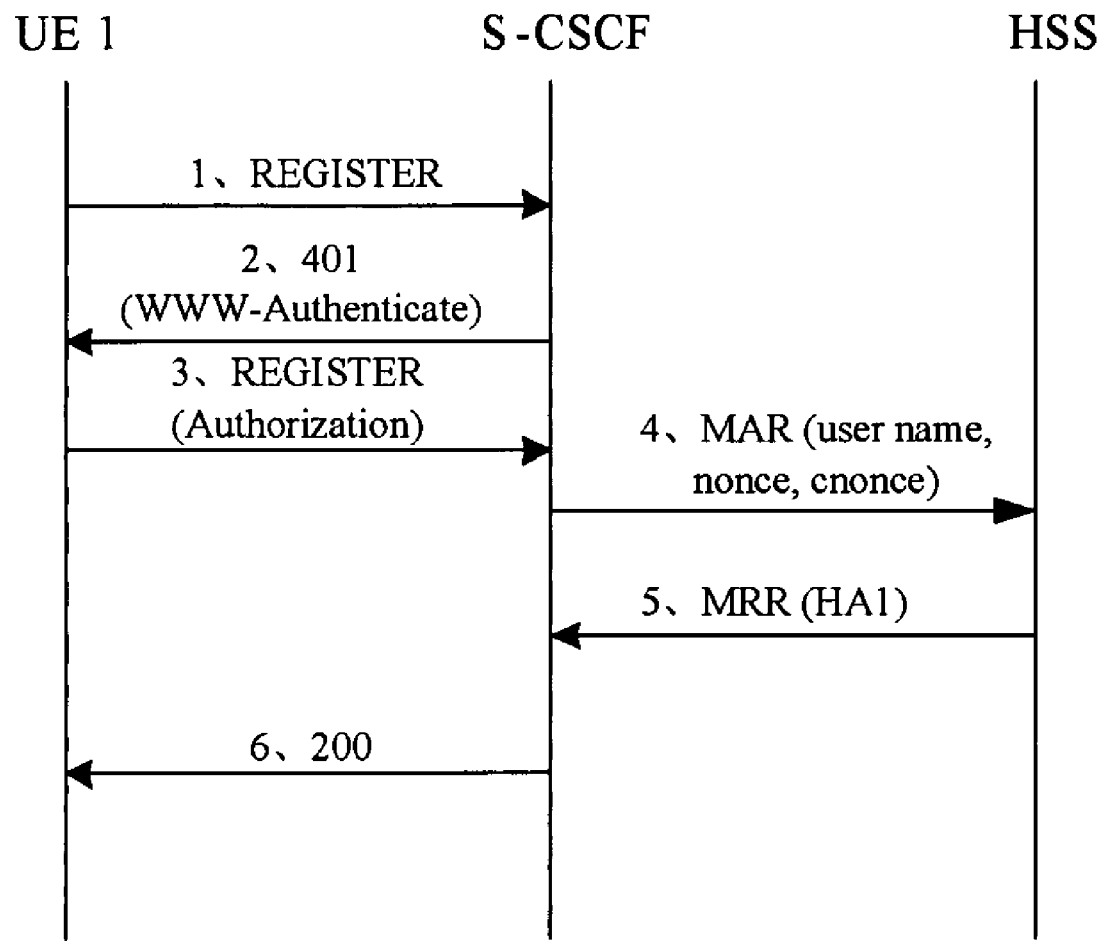
FIG. 5 shows a flow chart for user equipment authentication through an S-CSCF entity with the use of Digest MD5-sess according to the invention.

Referring to FIG. 5, in the IMS access domain, the S-CSCF entity performs the following specific steps for the Digest MD5-sess authentication in response to a registration request from a user equipment, where the part of the P-CSCF entity has been omitted.

In step 1, the user equipment sends a registration request message REGISTER to the S-CSCF entity.

In step 2, in response to the received request message, the S-CSCF generates respective parameters for an Authentication Challenge, such as "nonce", "qop", "realm", etc., and then generates the header field of WWW-Authenticate, and delivers in a 401 response the header field to the user equipment (transparently transmits it to the user equipment through the P-CSCF entity).

In step 3, the user equipment obtains the WWW-Authenticate (Authentication Challenge) from the 401 response, and then calculates a "request-digest" in conjunction with its key. Further, the user equipment carries the "request-digest" in the parameter "response" of the authentication response Authorization, and sends to the S-CSCF entity the authentication response in a re-initiated registration request message REGISTER.

In step 4, the S-CSCF entity obtains the parameters "nonce" and "cnonce" from the Authorization header field, and transfer in an MAR request s the parameters together with the username identity to the HSS.

In step 5, with respect to the subscriber identity, the HSS calculates the HA1 through the above formula in accordance with the relevant parameters, and carries in an MAA response the HA1 to the S-CSCF entity.

In step 6, the S-CSCF entity calculates a "request-digest" in accordance with the HA1 and the relevant authentication parameters. If the calculation result is the same as the content carried in the parameter "response" of the authentication response, the authentication succeeds, with a 200 response returned to the UE, otherwise an authentication failure response is returned.

At the Home Subscriber Server (HSS) in the IMS network, a corresponding algorithm configured for a subscriber can be "MD5" or "MD5-sess", and such configuration information can be used for a process in which the I-CSCF selects an S-CSCF for the subscriber. For example, an operator arranges one S-CSCF to perform only the MD5 algorithm (there is a security channel between the S-CSCF and the HSS) and another S-CSCF to perform only the MD5-sess algorithm. A registration request-from a subscriber for whom the MD5 authentication has been configured shall be allocated to the former S-CSCF.

In the case that the S-CSCF supports both of the algorithms (MD5 and MD5-sess), an authentication algorithm type corresponding to the subscriber can be obtained by the S-CSCF from the HSS, and then an authentication challenge can be issued (if the type is MD5, the HA1 will be directly sent back in an MAA). Alternatively, the S-CSCF indicates for the user equipment that it supports both of the algorithms, and employs an authentication algorithm as selected by the UE. When the S-CSCF interacts with the HSS, if the HSS determines that the authentication algorithm selected by the UE is inconsistent with a preconfigured one, an authentication failure message is returned to the subscriber.

Figure 6:
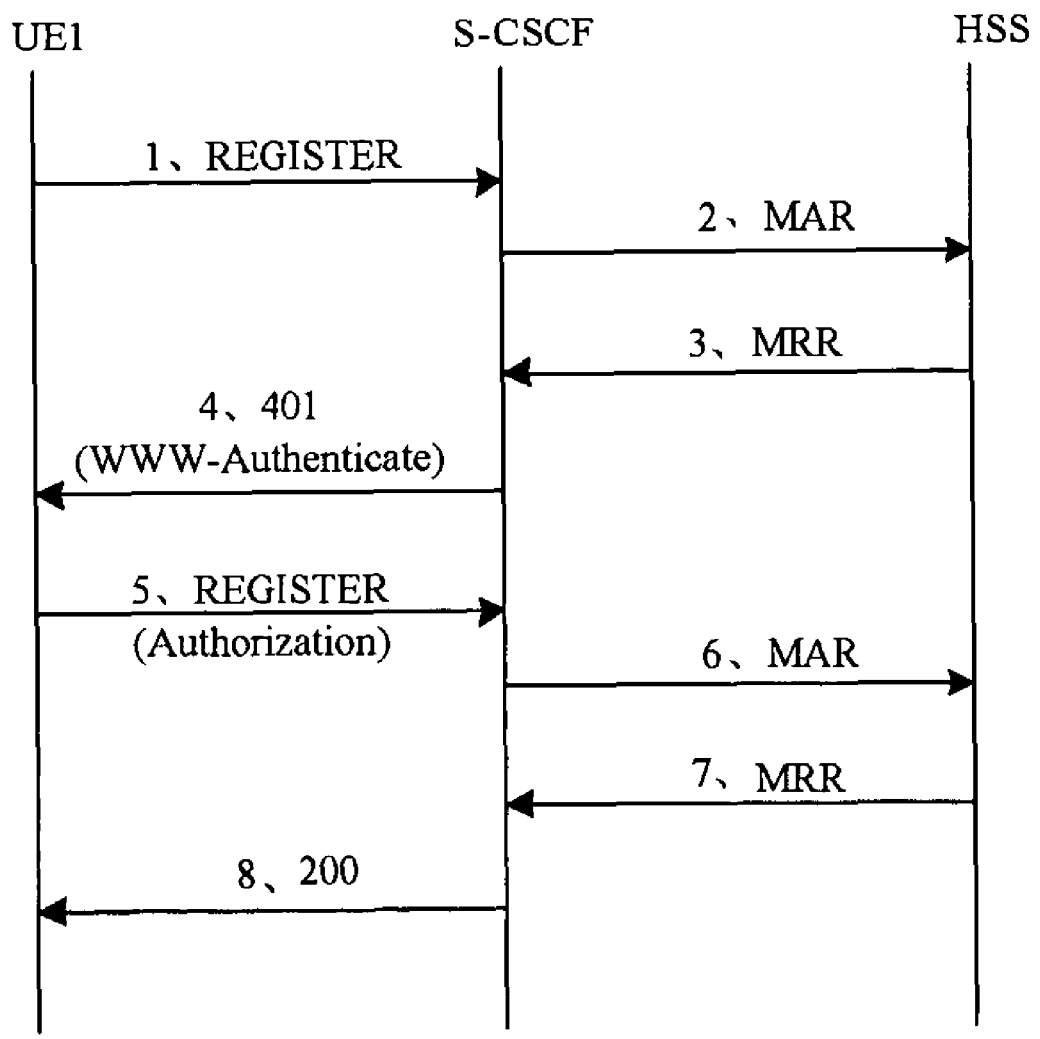
FIG. 6 shows a flow chart for user equipment authentication through an HSS with the use of a Digest Authentication Algorithm according to the invention.

Referring to FIG. 6, in the IMS access domain, the HSS entity performs Digest authentication on a user equipment in response to a registration request as follows (where the P-CSCF entity has been omitted).

In step 1, the user equipment sends a registration request message REGISTER to the S-CSCF entity.

In step 2, the S-CSCF entity sends to the HSS an MAR request carrying a subscriber identity.

In step 3, with respect to the subscriber identity, the HSS generates all the parameters required for an authentication challenge, such as "nonce", etc.; and sends these parameters to the S-CSCF entity in an SIP-Authenticate AVP of an MRR message returned from the S-CSCF entity.

In step 4, the S-CSCF generates the WWW-Authenticate header field based on these parameters generated by the HSS, and delivers the WWW-Authenticate header field in a 401 response to the UE (transmits it transparently to the user equipment through the P-CSCF entity).

In step 5, the user equipment obtains the WWW-Authenticate (Authentication Challenge) from the 401 response, and then calculates a "request-digest" in conjunction with its key. Further, the user equipment carries the "request-digest" in the parameter "response" of the authentication response Authorization, and sends the authentication response to the P-CSCF entity in a re-initiated registration request message REGISTER.

In step 6, the S-CSCF entity gets the authentication related parameter information generated by the UE, such as "cnonce", etc, from the parameter "response", and then carries these information in an SIP-Authentication AVP, which is carried in an MAR request, an d transfers the MAR request to the HSS.

In step 7, the HSS receives the authentication response, and then calculates a "request-digest" through the Digest Authentication Algorithm in accordance with the HA1 and the relevant authentication parameters. If this "request-digest" is the same as the content carried in the parameter "response" of the authentication response, the authentication succeeds, otherwise the authentication fails. The authentication result is sent to S-CSCF in an MAA message.

In step 8, if the S-CSCF receives an authentication success indication, a 200 response will be returned to the UE, otherwise a failure response will be returned.

Furthermore, if the user equipment is not enabled to establish any security channel with the P-CSCF, and no communication security between the user equipment and the P-CSCF can be guaranteed by the underlying IP networking, no secure communication between the UE and the P-CSCF can be guaranteed upon access of such a subscriber. In order to guarantee a secure communication, an authentication method for a subsequent request message can be configured in the subscriber configuration data of the HSS. Upon success of the registration authentication, the Digest Authentication can be performed for the subsequent request message in accordance with this authentication method. If the subsequent request message passes the Digest Authentication, a following process is performed, otherwise the request message is rejected.

The authentication method for a subsequent request messages can include the following.

1. The Digest Authentication can be performed only for the registration request REGISTER.

2. In addition to the registration request, the Digest Authentication can be performed for each session request INVITE.

3. In addition to the registration request and the session request, the Digest Authentication can be performed for any other request message.

Such configuration information can be effected by an authentication entity in the IMS network, for example, the S-CSCF entity or the HSS as described above.

Figure 7:
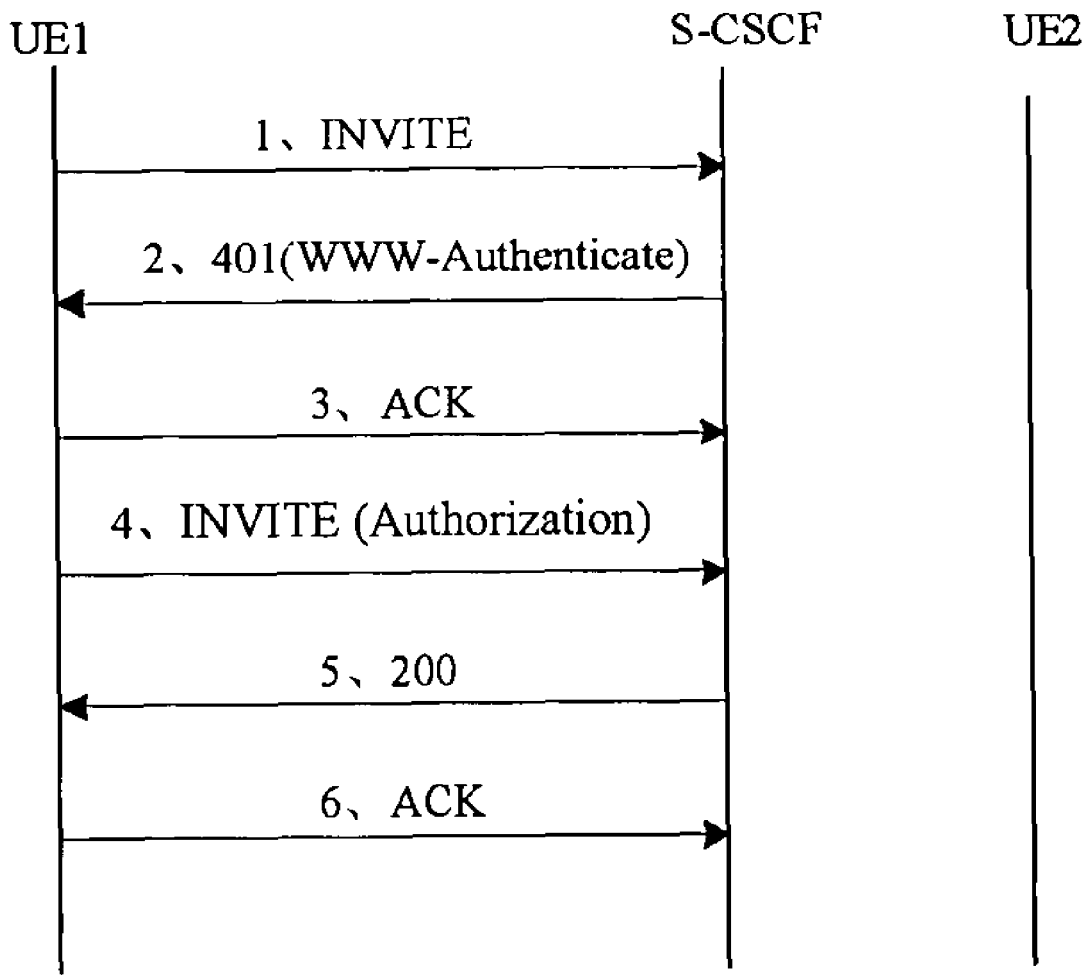
FIG. 7 shows a flow chart for the Digest Authentication in response to a subsequent request message for session establishment.

As shown in FIG. 7, the S-CSCF entity authenticates the session request INVITE as follows.

In step 1, the S-CSCF entity receives a session request INVITE initiated by a user equipment UE1 to a user equipment UE2, and then generates the header field of authentication challenge WWW-Authenticate. As described above, the interaction with the HSS shall be required for generation of the authentication challenge.

In step 2, the S-CSCF entity sends a 401 (WWW-Authenticate) response message to the user equipment UE1 through the P-CSCF entity (not shown).

In step 3, the user equipment UE1 receives the 401 response, and then sends a response message ACK to the S-CSCF entity.

In step 4, the user equipment UE1 generates an authentication response (for details, see the above related descriptions), and sends in a session request INVITE (Authorization) the authentication response to the S-CSCF entity.

In step 5, the S-CSCF entity verifies the content in the authentication response through the Digest Authentication Algorithm in accordance with the relevant parameters. If the verification has been passed, the S-CSCF entity sends a 200 response to the user equipment UE1, otherwise an authentication failure response can be returned.

In step 6, the user equipment UE1 returns a response ACK to the S-CSCF.

After the authentication for the user equipment registration has been passed, the authentication method configured on the HSS for a subsequent request message can be delivered to the S-CSCF entity, and the S-CSCF entity in turn determines in accordance with the authentication method an authentication method for a subsequent request message. If an authentication is required, the HSS can still act as an authentication entity, and the authentication can be performed in the same way as described above.

A concept of "Authentication Session" applies when the Digest authentication method is used for authentication of a subscriber request, which has been described in RFC2617. When the network issues an authentication challenge to the UE, it indicates that an authentication session starts. During this session, the UE can carry an authentication response in a subsequent request message. The parameter "nc" is increased by 1 each time an authentication response is carried. Only after a new authentication challenge has been issued from the network in response to a request from the UE, the current authentication session can be terminated, and a new authentication session can start.

When the Digest Authentication is performed for each request message from the UE, the IMS network operator can select an "authentication session" for the subscriber in either of the following ways.

1. An "authentication session" for a subscriber request message can be equal to a subscriber registration period.

Upon success of the subscriber registration, the S-CSCF can negotiate with the subscriber about the registration period. The UE can re-initiate a REGISTER request within the registration period, and thus the registration status can be kept away from timing out. New parameters such as "nonce" can be generated and a new authentication challenge can be issued only when the S-CSCF receives a registration or re-registration request. For other requests including the INVITE session request, no new authentication challenge can be generated or issued.

2. An "authentication session" for a subscriber request message can be equal to a subscriber session period.

In addition to generation and issuing of a new authentication challenge for each registration request REGISTER from the subscriber, the S-CSCF can generate and issue a new authentication challenge for each SIP session (Dialog) establishment request and an out-session request. However, no new authentication challenge will be generated for an in-session SIP request.

In the case that the authentication entity of the IMS network is the S-CSCF, because data configuration with respect to the "authentication method for a subsequent request" and the "authentication session" for a subscriber has been configured on the HSS, the S-CSCF needs to obtain such subscriber-related configuration information. The S-CSCF can obtain such subscriber configuration information in a way that, after the authentication for the subscriber succeeds, the S-CSCF can interact with the HSS through Diameter SAR/SAA, so as to download such information from the HSS to the S-CSCF along with subscription information of the subscriber.

While the preferred embodiments of the present invention have been described as above, it shall be appreciated that the scope of the present invention shall not be limited thereto, and those skilled in the art can obviously make various variations and modifications to the embodiments without departing from the scope of the present invention. Thus, it is intended that all such variations and modifications shall fall within the scope of the present invention as solely defined in the claims thereof

What is claimed is:

1. A method for authenticating a user equipment in an IP multimedia subsystem, comprising:

generating, by a Serving-Call Session Control Function (S-CSCF) entity, an authentication challenge through a Digest Authentication Algorithm in response to a subscriber request, and sending the authentication challenge to the user equipment through a Proxy-Call Session Control Function (P-CSCF) entity;

receiving, by the user equipment, the authentication challenge;

generating, by the user equipment, an authentication response through the Digest Authentication Algorithm in accordance with a subscriber key and the authentication challenge, and sending the authentication response to the S-CSCF entity through the P-CSCF entity;

receiving, by the S-CSCF entity, the authentication response; and verifying, by the S-CSCF entity, the authentication response through the Digest Authentication Algorithm in accordance with information HA1 related to the subscriber key and the authentication response, and if the verification is passed, determining that the authentication for the user equipment succeeds, otherwise determining that the authentication for the user equipment fails, wherein the Digest Authentication Algorithm includes a Digest MD5 algorithm, and the S-CSCF entity obtains the HA1 through interacting with a Home Subscriber Server (HSS) before generating the authentication challenge or upon receiving the authentication response, wherein the obtaining the HA1 comprises:
sending, by the S-CSCF entity, to the HSS a request message carrying a subscriber identity; and
generating, by the HSS, the HA1 in accordance with a domain name of a domain corresponding to the subscriber, the subscriber identity and the subscriber key, and returning to the S-CSCF entity the HA1 in a response message.

2. The method according to claim 1, wherein the subscriber identity is a public user identity or a private user identity.

3. A method for authenticating a user equipment in an IP multimedia subsystem, comprising:
generating, by a Serving-Call Session Control Function (S-CSCF) entity, an authentication challenge through a Digest MD5-Sess algorithm in response to a subscriber request, and sending the authentication challenge to the user equipment through a Proxy-Call Session Control Function (P-CSCF) entity;

receiving, by the user equipment, the authentication challenge;

generating, by the user equipment, an authentication response through the Digest MD5-Sess algorithm in accordance with a subscriber key and the authentication challenge, and sending the authentication response to the S-CSCF entity through the P-CSCF entity;

receiving, by the S-CSCF entity, the authentication response verifying, by the S-CSCF entity, the authentication response through the Digest MD5-Sess algorithm in accordance with information HA1 related to the subscriber key, and the authentication response, and if the verification is passed, determining that the authentication for the user equipment succeeds, otherwise determining that the authentication for the user equipment fails; and obtaining, by the S-CSCF entity, the HA1 by:
sending, by the S-CSCF entity, to a Home Subscriber Server (HSS) a request message carrying a subscriber identity, a parameter "nonce" and a parameter "cnonce" upon receipt of the authentication response; and
generating, by the HSS, the HA1 in accordance with a domain name of a domain corresponding to the subscriber, the subscriber identity, the subscriber key, the parameter "nonce" and the parameter "cnonce", "cnonce", and returning to the S-CSCF entity the HA1 in a response message.

4. A method for authenticating a user equipment in an IP multimedia subsystem, comprising:
generating, by a Serving-Call Session Control Function (S-CSCF) entity, an authentication challenge through a Digest Authentication Algorithm in response to a registration request, and sending the authentication challenge to the user equipment through a Proxy-Call Session Control Function (P-CSCF) entity;

receiving, by the user equipment, the authentication challenge;

generating, by the user equipment, an authentication response through the Digest Authentication Algorithm in accordance with a subscriber key and the authentication challenge, and sending the authentication response to the S-CSCF entity through the P-CSCF entity;

receiving, by the S-CSCF entity, the authentication response; and verifying, by the S-CSCF entity, the authentication response through the Digest Authentication Algorithm in accordance with information HA1 related to the subscriber key and the authentication response, and if the verification is passed, determining that the authentication for the user equipment succeeds, otherwise determining that the authentication for the user equipment fails, wherein after the authentication for the user equipment succeeds, an authentication mode for authenticating a subsequent request message configured at an HSS is sent to the S-CSCF entity, and the S-CSCF entity authenticates the subsequent request message according to the authentication mode.

5. The method according to claim 4, wherein the authentication mode comprises one of authenticating only a registration request message, authenticating only a registration request and a session request message, or authenticating each request message.

6. The method according to claim 5, wherein in the case of authentication for each request message, an authentication period for a subscriber request message is configured equal to a subscriber registration period or a subscriber session period.

7. A method for authenticating a user equipment in an IP multimedia subsystem, comprising:
generating, by a Home Subscriber Server (HSS), parameters required for generating an authentication challenge in a Digest Authentication in accordance with a subscriber identity carried in a request message sent from a Serving-Call Session Control Function (S-CSCF) entity, and sending the parameters to the S-CSCF entity;

generating, by the S-CSCF entity, the authentication challenge in accordance with the parameters, and sending the authentication challenge to the user equipment through a Proxy-Call Session Control Function (P-CSCF) entity;

generating, by the user equipment, an authentication response through a Digest Authentication Algorithm in accordance with a subscriber key and the authentication challenge, and transferring the authentication response to the HSS through the P-CSCF entity and the S-CSCF entity; and verifying, by the HSS, contents in the authentication response through the Digest Authentication Algorithm in accordance with the subscriber key and the authentication response, and if the verification is passed, informing the S-CSCF entity that the authentication for the user equipment succeeds, otherwise informing the S-CSCF entity that the authentication for the user equipment fails.

8. The method according to claim 7, wherein the subscriber identity is a public user identity or a private user identity.

9. The method according to claim 7, wherein after the authentication for the user equipment succeeds, an authentication mode for authenticating a subsequent request message configured at the HSS is sent to the S-CSCF entity, and the S-CSCF entity authenticates the subsequent request message according to the authentication mode.

10. The method according to claim 9, wherein the authentication mode comprises one of authenticating only a registration request message, authenticating only a registration request and a session request message, or authenticating each request message.

11. The method according to claim 10, wherein in the case of authentication for each request message, an authentication period for a subscriber message is configured equal to a subscriber registration period or a subscriber session period.

12. An authentication method in an IP multimedia subsystem, comprising:

receiving, by a Serving-Call Control Function (S-CSCF) entity, a registration request from a user equipment;

generating, by the S-CSCF entity, an authentication challenge through a Digest Authentication Algorithm, and sending the authentication challenge to the user equipment through a Proxy-Call Session Control Function (P-CSCF) entity;

receiving, by the S-CSCF entity, an authentication response sent from the user equipment, wherein the authentication response is generated by the user equipment through the Digest Authentication Algorithm according to a subscriber key and the authentication challenge sent from the S-CSCF entity; and verifying, by the S-CSCF entity, the authentication response through the Digest Authentication Algorithm according to HA1 related to the subscriber key and the authentication response, and if the verification is passed, determining that the authentication for the user equipment succeeds, otherwise determining that the authentication for the user equipment fails, wherein the Digest Authentication Algorithm is a Digest MD5 algorithm, and the method further comprises:

sending, by the S-CSCF entity, to a Home Subscriber Server (HSS) an authentication request message carrying a subscriber identity which is carried in the registration request; and receiving, by the S-CSCF entity, an authentication response message carrying the HA1 from the HSS, wherein the HA1 is generated by the HSS according to a domain name of a domain corresponding to the subscriber, the subscriber identity and the subscriber key.

13. An authentication method in an IP multimedia subsystem, comprising:

receiving, by a Serving-Call Control Function (S-CSCF) entity, a registration request from a user equipment;

generating, by the S-CSCF entity, an authentication challenge through a Digest Authentication Algorithm, and sending the authentication challenge to the user equipment through a Proxy-Call Session Control Function (P-CSCF) entity;

receiving, by the S-CSCF entity, an authentication response sent from the user equipment, wherein the authentication response is generated by the user equipment through the Digest Authentication Algorithm according to a subscriber key and the authentication challenge sent from the S-CSCF entity; and verifying, by the S-CSCF entity, the authentication response through the Digest Authentication Algorithm according to HA1 related to the subscriber key and the authentication response, and if the verification is passed, determining that the authentication for the user equipment succeeds, otherwise determining that the authentication for the user equipment fails, wherein the Digest Authentication Algorithm includes a Digest MD5-Sess algorithm, and the method further comprises:

sending, by the S-CSCF entity, to a Home Subscriber Server (HSS) a authentication request carrying a subscriber identity, a parameter "nonce" and a parameter "cnonce" upon receiving the authentication response from the user equipment; and receiving, by the S-CSCF entity, an authentication response message carrying the HA1 from the HSS, wherein the HA1 is generated by the HSS according to a domain name of a domain corresponding to the subscriber, the subscriber identity, the subscriber key, the parameter "nonce" and the parameter "cnonce".

14. An authentication method in an IP multimedia subsystem, comprising:

receiving, by a Serving-Call Control Function (S-CSCF) entity, a registration request from a user equipment;

generating, by the S-CSCF entity, an authentication challenge through a Digest Authentication Algorithm, and sending the authentication challenge to the user equipment through a Proxy-Call Session Control Function (P-CSCF) entity;

receiving, by the S-CSCF entity, an authentication response sent from the user equipment, wherein the authentication response is generated by the user equipment through the Digest Authentication Algorithm according to a subscriber key and the authentication challenge sent from the S-CSCF entity; and verifying, by the S-CSCF entity, the authentication response through the Digest Authentication Algorithm according to HA1 related to the subscriber key and the authentication response, and if the verification is passed, determining that the authentication for the user equipment succeeds, otherwise determining that the authentication for the user equipment fails, wherein the authentication response sent from the user equipment carries a first "request-digest" calculated through the Digest Authentication Algorithm according to the subscriber key and the authentication challenge sent from the S-CSCF entity, and the method further comprises:

calculating, by the S-CSCF entity, a second "request-digest" according to the HA1 and the authentication response from the user equipment; and comparing, by the S-CSCF entity, the first "request-digest" and the second "request-digest", and determining that the user is authenticated successfully if the first "request-digest" and the second "request-digest" are same.

15. An authentication method in an IP multimedia subsystem, comprising:

generating, by a Home Subscriber Server (HSS), parameters required for generating an authentication challenge in a Digest Authentication according to a subscriber identity carried in a request message sent from a Serving-Call Session Control Function (S-CSCF) entity, and sending the parameters to the S-CSCF entity;

receiving, by the HSS, an authentication response sent from a user equipment through a Proxy-Call Session Control Function (P-CSCF) entity and the S-CSCF entity, wherein the authentication response is generated by the user equipment through a Digest Authentication Algorithm according to a subscriber key and a authentication challenge which is generated by the S-CSCF entity according to the parameters and is sent to the user equipment;

verifying, by the HSS, contents in the authentication response through the Digest Authentication Algorithm according to the subscriber key and the authentication response, and if the verification is passed, informing the S-CSCF entity that the authentication for the user equipment succeeds.

* * * * *

UNITED STATES PATENT AND TRADEMARK OFFICE
CERTIFICATE OF CORRECTION

PATENT NO.       : 8,335,487 B2                                   Page 1 of 1
APPLICATION NO.  : 11/896389
DATED            : December 18, 2012
INVENTOR(S)      : Kai Wen et al.

It is certified that error appears in the above-identified patent and that said Letters Patent is hereby corrected as shown below:

Column 13:
Line 56, delete "response" and insert --response;--.
Line 60, delete "key," and insert --key--.

Column 14:
Lines 7-8, delete second occurrence of ""counce",".

Signed and Sealed this
Second Day of April, 2013

Teresa Stanek Rea
*Acting Director of the United States Patent and Trademark Office*